United States Patent
Wang

(10) Patent No.: US 9,477,609 B2
(45) Date of Patent: Oct. 25, 2016

(54) ENHANCED TRANSACTIONAL CACHE WITH BULK OPERATION

(71) Applicant: SAP AG, Walldorf (DE)

(72) Inventor: Bo Wang, Shanghai (CN)

(73) Assignee: SAP SE, Walldorf (DE)

( * ) Notice: Subject to any disclaimer, the term of this patent is extended or adjusted under 35 U.S.C. 154(b) by 460 days.

(21) Appl. No.: 13/869,926

(22) Filed: Apr. 24, 2013

(65) Prior Publication Data

US 2014/0317047 A1    Oct. 23, 2014

(30) Foreign Application Priority Data

Apr. 22, 2013   (CN) .......................... 2013 1 0140940

(51) Int. Cl.
*G06F 17/30* (2006.01)
*G06F 17/00* (2006.01)
*G06F 12/08* (2016.01)

(52) U.S. Cl.
CPC ..... *G06F 12/0891* (2013.01); *G06F 17/30377* (2013.01)

(58) Field of Classification Search
CPC .................. G06F 17/30592; G06F 17/30315; G06F 21/60; G06F 21/6218; G06F 17/30563; G06F 17/30; G06F 17/30575; G06F 19/3443; G06F 19/345; G06F 17/30073; G06F 17/30286; G06F 17/30289; G06F 17/30292; G06F 17/30312; G06F 17/3048; G06F 17/30569
See application file for complete search history.

(56) References Cited

U.S. PATENT DOCUMENTS

| | | |
|---|---|---|
| 5,794,228 A | 8/1998 | French et al. |
| 8,392,382 B2 | 3/2013 | Marwah et al. |
| 8,548,945 B2 | 10/2013 | Dwyer et al. |
| 8,631,000 B2 | 1/2014 | Franke et al. |
| 8,650,150 B2 | 2/2014 | Zhao et al. |
| 2004/0010499 A1* | 1/2004 | Ghosh et al. ................. 707/100 |
| 2004/0236726 A1* | 11/2004 | Ewing et al. ..................... 707/3 |
| 2005/0192961 A1 | 9/2005 | Dittrich et al. |
| 2009/0240663 A1 | 9/2009 | Plattner et al. |
| 2011/0202497 A1 | 8/2011 | Marschall et al. |
| 2011/0246434 A1* | 10/2011 | Cheenath ............ G06F 17/3038 707/703 |
| 2011/0264667 A1 | 10/2011 | Harizopoulos et al. |
| 2012/0036165 A1 | 2/2012 | Driesen et al. |
| 2012/0054447 A1 | 3/2012 | Swart et al. |
| 2012/0221528 A1 | 8/2012 | Renkes et al. |
| 2013/0073513 A1* | 3/2013 | Kemper et al. ............... 707/600 |
| 2013/0151502 A1 | 6/2013 | Yoon et al. |
| 2013/0166553 A1 | 6/2013 | Yoon et al. |
| 2013/0166566 A1 | 6/2013 | Lemke et al. |
| 2013/0179395 A1 | 7/2013 | Heman et al. |

OTHER PUBLICATIONS

Plattner (A common Database Appoach for OLTp and OLAP using an In-Memory column database.*

* cited by examiner

*Primary Examiner* — Yicun Wu
(74) *Attorney, Agent, or Firm* — Horizon IP Pte. Ltd.

(57) ABSTRACT

Described herein is a technology for providing enhanced transactional caching. In accordance with one aspect, a transactional cache associated with a database is configured. Execution of a write operation on the database is delayed until a flush is determined to be necessary. The write operation is delayed by writing to the transactional cache. The flush is invoked by writing inserted or updated records in the transactional cache to the database via a bulk operation.

20 Claims, 7 Drawing Sheets

ENHANCED TRANSACTIONAL CACHE WITH BULK OPERATION

TECHNICAL FIELD

The present disclosure relates generally to data management in enterprise applications that access database systems. More particularly, the present disclosure relates to enhanced transactional caching in enterprise applications that access database systems.

BACKGROUND

Databases are often used to support transactional data processing applications, such as financials, sales, order fulfillment, manufacturing, human resources, and enterprise resource planning applications. A system that implements a transaction application and its associated database (e.g., relational database) is referred to as an online transaction processing (OLTP) system. In an OLTP system, there is a need for fast reads and writes of the transactional data to update many portions of the database simultaneously.

OLTP systems are optimized for processing very small amounts of detailed data, but are generally not suited for analytical tasks that involve ad-hoc analysis of large data amounts. In order to perform queries without negatively impacting the performance of the OLTP system, online analytical processing (OLAP) systems were developed. OLAP systems are optimized for complex analytical and ad-hoc queries with a rapid execution time. OLAP systems retrieve data using pre-calculated data summaries, and are not efficient when handling small numbers of users doing custom analytical processing over very large volumes of non-indexed data.

Running both OLTP and OLAP on the same database has become an efficient way to reduce product total cost of ownership (TCO) and improve performance. However, due to the different types of operations involved, a database architecture that is suitable for OLAP optimization may not be suitable for OLTP. Conversely, a database architecture that is suitable for OLTP may not be suitable for OLAP.

For example, OLTP is characterized by a large number of row-based write operations (e.g., INSERT AND UPDATE), while OLAP typically optimizes performance by compressing attribute (or columns) with the help of dictionaries. The use of column-based databases for OLAP has become quite popular. However, due to the model gap between OLTP row-based operations and the column-based architecture, such column-based databases may be the bottleneck of some operations that are critical to OLTP. This is especially true for OLTP applications that involve many row-based write operations (e.g., INSERT and UPDATE) that make up about 50% of the total transaction time in a typical enterprise resource planning (ERP) transaction (e.g., adding 100-line invoice with serial-and-batch items).

Thus, a need exists for systems, methods, and apparatuses to address the shortfalls of current technology, and to provide other new and innovative features.

SUMMARY

A computer-implemented technology for providing enhanced transaction caching is described herein. In accordance with one aspect, a transactional cache associated with a database is configured. Execution of a write operation on the database is delayed until a flush is determined to be necessary. The write operation is delayed by writing to the transactional cache. The flush is invoked by performing a bulk operation to write inserted or updated records in the transactional cache to the database.

In accordance with another aspect, a transactional cache associated with a column-based in-memory database is configured. Execution of a write operation on the database is delayed until a flush is determined to be necessary. The write operation is delayed by writing to the transactional cache. The flush is invoked by performing a column-wise bulk operation that writes inserted or updated records in the transactional cache to the database.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Some embodiments are illustrated in the accompanying figures, in which like reference numerals designate like parts, and wherein.

DETAILED DESCRIPTION

Figure 1:
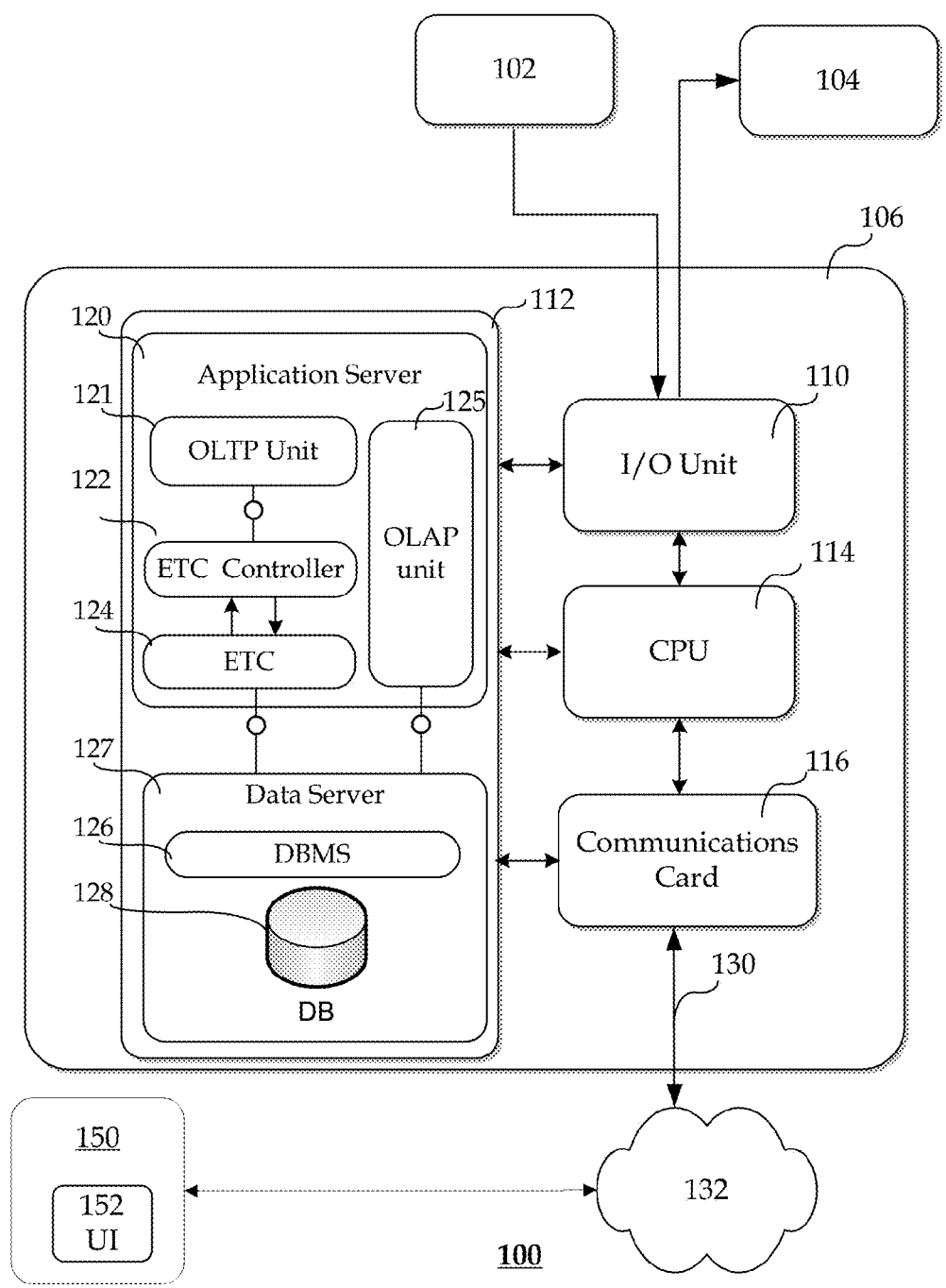
FIG. 1 is a block diagram of an exemplary system.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent in their performance.

The following description sets forth one or more implementations of systems and methods for facilitating transactional caching. One implementation of the present framework provides various enhancements to a transactional cache so as to support both read and write operations (e.g., INSERT, UPDATE, etc.). Write operations may be delayed until a flush operation is necessary. The flush operation may be invoked by collecting newly inserted or updated records in the enhanced transactional cache and then writing them to the database using a bulk operation (e.g., column-wise).

Caching generally refers to the temporary storage of data to achieve higher performance in software systems. A transactional cache temporarily stores the results of a database transaction (i.e. an atomic work unit of database access) to reduce the number of database accesses. Conventional transactional caches typically achieve performance gain by reducing the number of accesses to the original record of data, but do not reduce the number of write operations (e.g., INSERT, UPDATE). In one implementation of the present framework, a bulk operation is combined with an enhanced transactional cache to reduce both read and write operations in a column-based database, thereby achieving greater performance improvement (e.g., 20% in a typical transaction).

By minimizing the model gap between OLTP's row-based operations and column-oriented storage, OLTP performance can be improved dramatically. The present framework advantageously increases the applicability of bulk operations for invoking a flush. All INSERT and UPDATE operations executed on the same table in a transaction may benefit from the bulk operation even if they are distributed in different locations. In addition, the transactional cache is transparent to the OLTP application developer. This means that the performance of the OLTP application may be improved without changing the existing business logic design and implementation.

The framework described herein may be implemented as a method, computer-controlled apparatus, a computer process, a computing system, or as an article of manufacture such as a computer-usable medium. These and various other features will be apparent from the following description.

FIG. 1 shows a block diagram illustrating an exemplary system 100 that may be used to implement the framework described herein. System 100 may include a computer system 106 communicatively coupled to an input device 102 (e.g., keyboard, touchpad, microphone, camera, etc.) and an output device 104 (e.g., display device, monitor, printer, speaker, etc.). Computer system 106 also may include a communications card or device 116 (e.g., a modem and/or a network adapter) for exchanging data with network 132 using a communications link 130 (e.g., a telephone line, a wireless network link, a wired network link, or a cable network). Network 132 may be a local area network (LAN) or a wide area network (WAN). The computer system 106 may be communicatively coupled to one or more other computer systems 150 via network 132. For example, computer system 106 may act as a server and operate in a networked environment using logical connections to one or more client computers 150. Client computers 150 may include components similar to the computer system 106, and may be in the form of a desktop computer, mobile device, tablet computer, communication device, etc.

Computing system 106 includes a central processing unit (CPU) 114, an input/output (I/O) unit 110, and a non-transitory memory device 112. Other support circuits, such as a cache, power supply, clock circuits and a communications bus, may also be included in computing system 106. In addition, any of the foregoing may be supplemented by, or incorporated in, application-specific integrated circuits. Examples of computing system 106 include a handheld device, a mobile device, a personal digital assistance (PDA), a workstation, a server, a portable laptop computer, another portable device, a mini-computer, a mainframe computer, a storage system, a dedicated digital appliance, a device, a component, other equipment, or some combination of these capable of responding to and executing instructions in a defined manner.

Memory device 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory device 112 serves to store machine-executable instructions, data, and various software components for implementing the techniques described herein, all of which may be processed by CPU 114. As such, the computer system 106 is a general-purpose computer system that becomes a specific purpose computer system when executing the machine-executable instructions. Alternatively, the various techniques described herein may be implemented as part of a software product, which is executed via an application server 120. Each computer program may be implemented in a high-level procedural or object-oriented programming language (e.g., C, C++, Java, Advanced Business Application Programming (ABAP™) from SAP® AG, etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In one implementation, the memory module 112 of the computer system 106 includes an application server 120 and a data server 127. The application server 120 may store an online transaction processing (OLTP) unit 121, an Enhanced Transactional Cache (ETC) controller 122, an ETC 124, and an online analytical processing (OLAP) unit 125.

OLTP unit 121 may include source code and executable machine code, for performing the functions of a business application. OLTP unit 121 may be designed to perform various transaction-oriented functions, such as customer relationship management (CRM), enterprise resource management (ERP) application, human resource management, enterprise content management (ECM), business process management (BPM), product lifecycle management, and so forth. OLTP unit 121 may be coded using a high-level programming language, such as Java, C++, ABAP™, etc. Other types of programming languages are also useful. OLTP unit 121 generates data (referred to as "transaction data") that may be stored in the computing system 106. Transaction data includes, for example, information relating to the sale of goods (e.g., location, time, price, quantity, etc.), production of goods (e.g., quantity, supplier, raw materials, cost, etc.), telemarketing data, customer support data, and so forth.

Application server 120 may include an OLAP unit 125, including source code and executable machine code, for performing analysis of data. OLAP unit 125 may be designed to perform various business functions, such as business reporting (e.g., for sales, marketing, management, financial, etc.), business process management (BPM), budgeting and forecasting, and so forth. OLAP unit 125 may be coded using a high-level programming language, such as Java, C++, ABAP™, etc. Other types of programming languages are also useful.

In accordance with one implementation, OLTP Unit 121 is communicatively coupled to ETC controller 122. ETC controller 122 manages ETC 124. During initialization, ETC controller 122 creates and configures ETC 124. More particularly, ETC controller 122 may provide configuration, lifecycle management, status management, flush management, query order management, cache size management, version control, and/or other services, which will be described in more detail in the following description.

In one implementation, ETC 124 is a transaction level cache with a life cycle that is the same as a database transaction. In other words, its contents will be cleared when the transaction ends (e.g., commit, roll-back, etc.). Usually, ETC 124 is a component of a "persistence layer", which is a group of software classes that make it easier for a program to persist its state. Since ETC 124 is temporary, consuming a large amount of memory space may be acceptable. However, to avoid using up too much memory space (e.g., when the query has a non-unique key), ETC controller 122 may limit the number of records to be cached (e.g., maximum of 100).

Data server 127 may include a database management system (DBMS) 126 and a database 128. DBMS 126 may include a set of programs to define, administer and process the database 128. A user at the client computer 150 may interact with a user interface (UI) 152 to communicate with the database 128 via the application server 120 and the DBMS 126. UI 152 may be a graphical user interface and include optional user interface components such as windows, menus, buttons, check boxes, charts, icons, etc.

In one implementation, database 128 is an in-memory database that relies primarily on the system's main memory for efficient computer data storage. More particularly, the data in the in-memory database resides in volatile memory and is not persistently stored on a hard drive, thereby allowing the data to be instantly accessed and scanned at a speed of several megabytes per millisecond. Some data of the in-memory database, such as the transaction log file, may still be persistently stored for recovery purposes. The in-memory database 128 allows seamless access to and propagation of high volumes of data in real-time. Parallel processing may further be achieved by using a multicore processor 114 in conjunction with the in-memory database 128. In-memory database technology includes systems such as SAP's HANA (high performance analytic appliance) in-memory computing engine.

In one implementation, in-memory database 128 is optimized for both OLAP and OLTP. By consolidating OLAP and OLTP into a single database, a lower total cost of ownership (TCO) may be achieved. Column-based data storage may further be implemented in the in-memory database 128, where data tables are stored as columns of data, in sequence and in compressed memory blocks. This may facilitate faster aggregation of data when calculations are performed on single columns. Alternatively, row-based data storage is also possible, where a table is stored as a sequence of records, each of which contains the fields of one row. In some implementations, instead of updating entire rows, only fields that have changed will be updated. This avoids having to lock entire data tables during updates to prevent conflicting modifications to a set of data. High levels of parallelization may be achieved, which is critical to real-time processing of live data streams and performing constant and substantially simultaneous updates.

It should be noted that the different components of the computer system 106 may be located on different physical machines. More particularly, components of the application server 120 and the data server 127 may be implemented on different physical machines or computer systems connected on the network 132. For instance, the OLTP unit 121, ETC controller 122 and ETC 124 may be implemented on one machine, while the OLAP unit 125 and data server 127 may be implemented on another two different physical machines. It should further be appreciated that the different components of the client computer 150 may also be located on the computer system 106.

Figure 2:
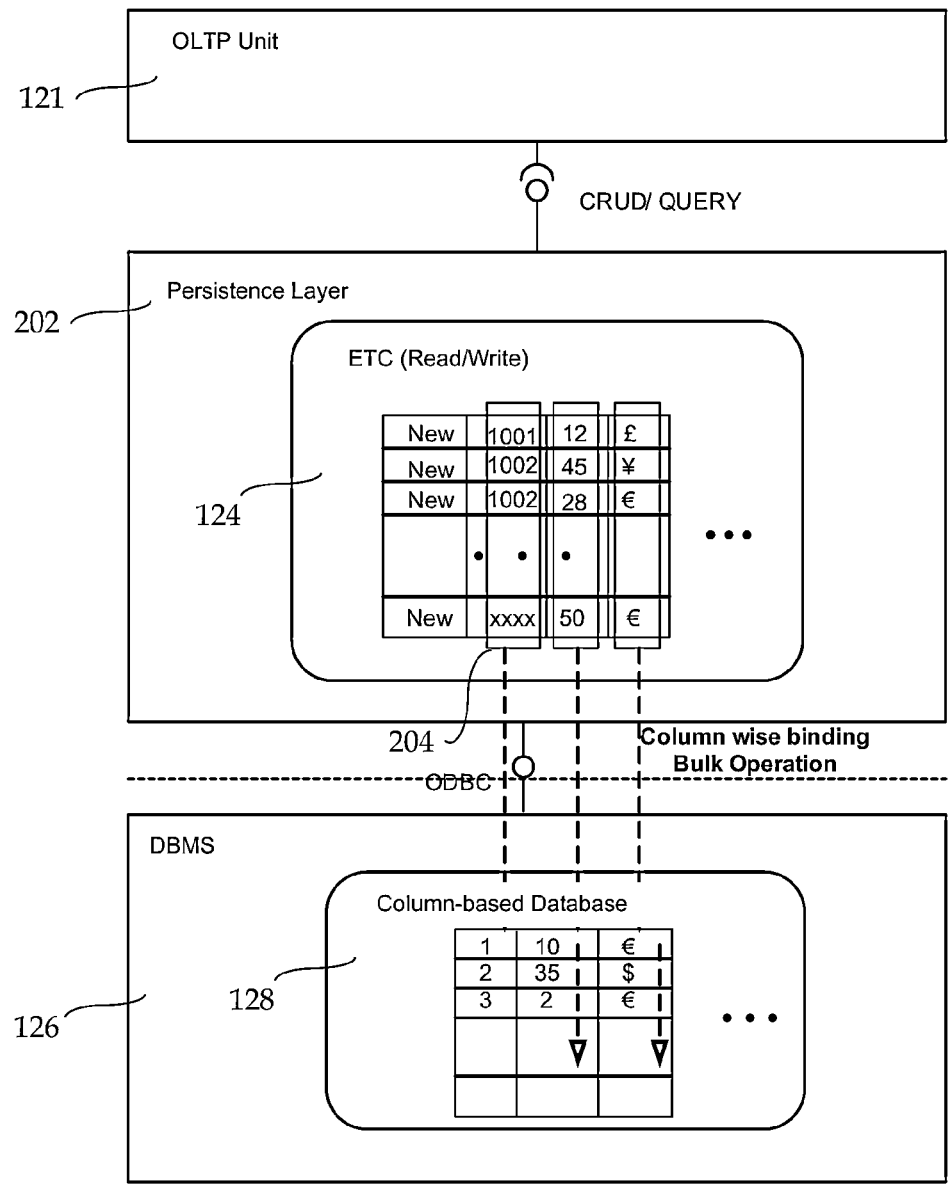
FIG. 2 is a block diagram of an exemplary architecture.

FIG. 2 is a block diagram of an exemplary architecture 200 of the present framework. The architecture 200 may be implemented in the computer system 106, or in different physical machines or computer systems connected on network 132, as previously described with reference to FIG. 1. It should be noted that in the following discussion, reference will be made, using like numerals, to the features described in FIG. 1.

In one implementation, the OLTP unit 121 communicates with the persistence layer 202. The persistence layer 202 may include an ETC 124 that serves as a proxy for database 128 and delays execution of both read and write accesses until a flush is determined to be necessary. A "Flush" generally refers to the action of writing dirty records in the ETC 124 to the database 128. To perform a flush, a bulk operation interface may be implemented. A "bulk operation" generally refers to the execution of multiple database access operations as a batch (or single unit of work). The bulk operation may be performed to write all newly inserted or old updated records in the ETC 124 to the database 128. By using a bulk operation, the number of "round-trips" of data between the application server 120 and the database 128 is reduced and performance is advantageously enhanced.

If the database 128 is column-based (as shown in FIG. 2), the bulk operation may be column-wise binding. A column-wise binding bulk operation binds one array to each column 204 for which data is returned from the ETC 124. For example, a column-wise binding bulk insert operation adds columns of data in the ETC 124 into respective columns of a table in the column-based database 128. Column-wise binding is particularly useful in improving the performance of column-oriented in-memory databases.

Figure 3:
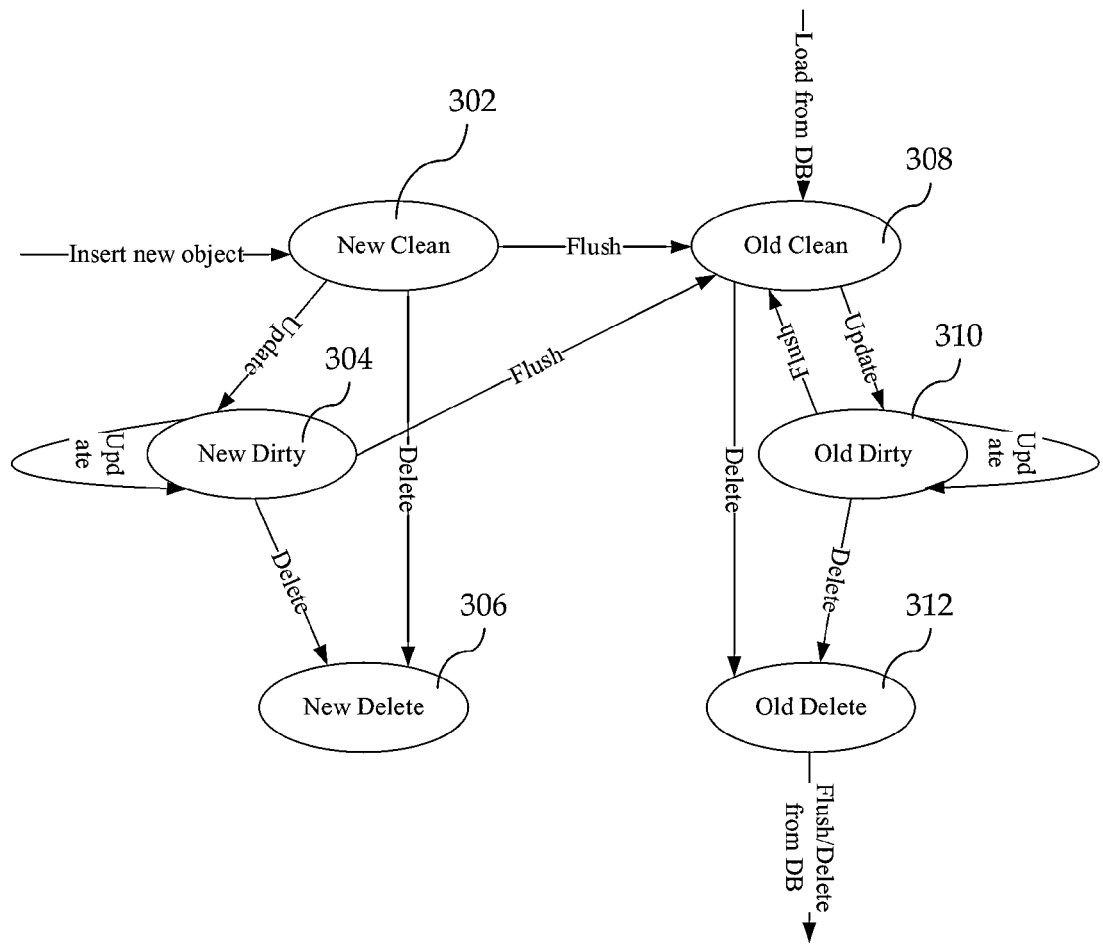
FIG. 3 shows an exemplary status transition diagram.

The bulk operation interface may be implemented using Open Database Connectivity (ODBC), which is a standard C programming language middleware Application Programming Interface (API) for accessing the DBMS 126. Other types of interfaces may also be used. An exemplary Open Database Connectivity (ODBC) routine may be invoked with the following statements:

SQLSetStmtAttr (*m_pStatement, SQL_ATTR_PARAM_BIND_TYPE, SQL_PARAM_BIND_BY_COLUMN, 0);
SQLSetStmtAttr (*m_pStatement, SQL_ATTR_PARAMSET_SIZE, Reinterpret_cast<SQLPOINTER> (bindRowCount), 0);

FIG. 3 shows an exemplary status transition diagram 300 of a record in the ETC 124. In order to support both read and write operations, each record may be associated with six possible statuses. Each record in the ETC 124 may include the memory address to which the entry corresponds, the value read or written, a status value that indicates whether the entry is New (requested by user to be added, but not inserted into database yet), Old (record loaded from database), Clean (not changed since it is added into cache), Dirty (changed by user since it is added into cache), Delete (requested by user to be deleted, but not executed on database yet), or a combination thereof.

As shown by the status transition diagram 300, there are six possible statuses (302, 304, 306, 308, 310, 312) for each record: New Clean, New Dirty, New Delete, Old Clean, Old Dirty and Old Delete. The transition from one status to another may be initiated in response to an event (indicated along each transition arrow). An event may triggered by receiving a database access operation (e.g., Insert, Delete, etc.).

Figure 4:
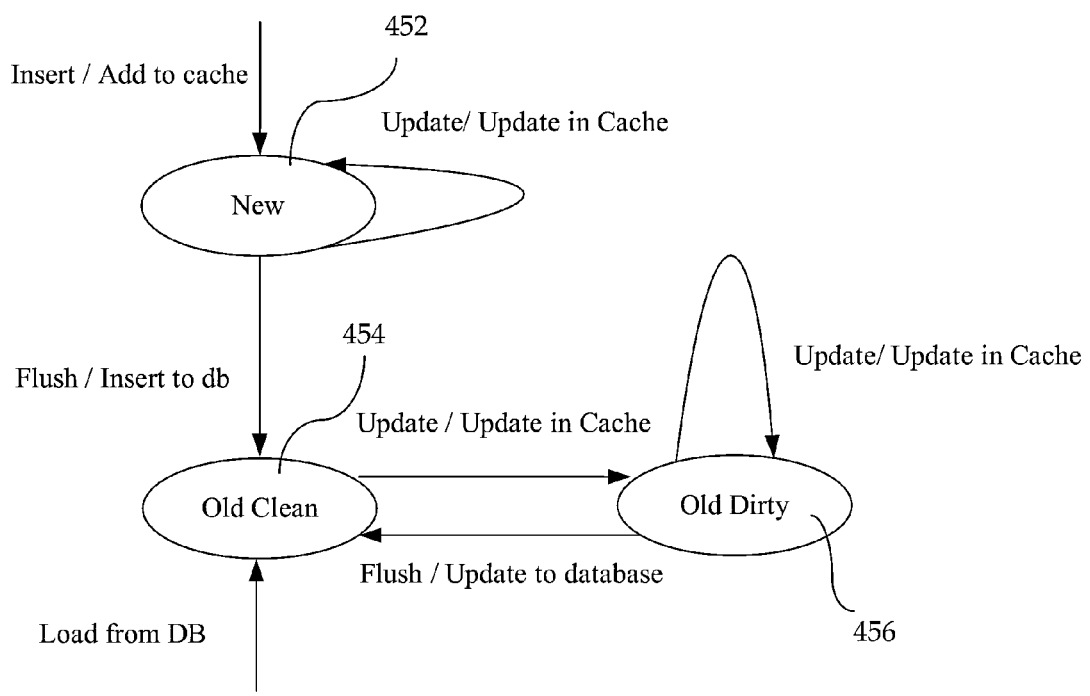
FIG. 4 shows another exemplary status transition diagram.

FIG. 4 is another exemplary status transition diagram 450. As shown, the number of possible statuses (452, 454, 456) of each record is three: New, Old Clean and Old Dirty. Each transition arrow is labeled with an Event/Action. The transition from one status to another is initiated by the occurrence of each respective Event/Action. For example, when the user requests to insert a record to the database, the ETC controller 122 adds the record to the ETC 124 and sets the status of the record in the ETC 124 to "New".

It should be appreciated that the status transition diagram 450 is a simplified implementation of the status transition diagram 300. Since the Delete operation is rarely used in a business application, the "New Delete" and "Old Delete" statuses (306 and 312) may be removed. A Write-through-DB policy may be defined for the Delete operation. The Write-through-DB policy indicates that the entry is deleted directly from the database 128 in response to receiving a Delete instruction. In addition, the corresponding entry may also be removed from the ETC 124. The "New Clean" and "New Dirty" statuses (302 and 304) may be combined into a "New" status 452. A Write-Delay policy may be implemented for Insert and Update operations. The Write-Delay policy indicates that the entry is temporarily stored in the ETC 124 and its status set to "New."

Figure 5:
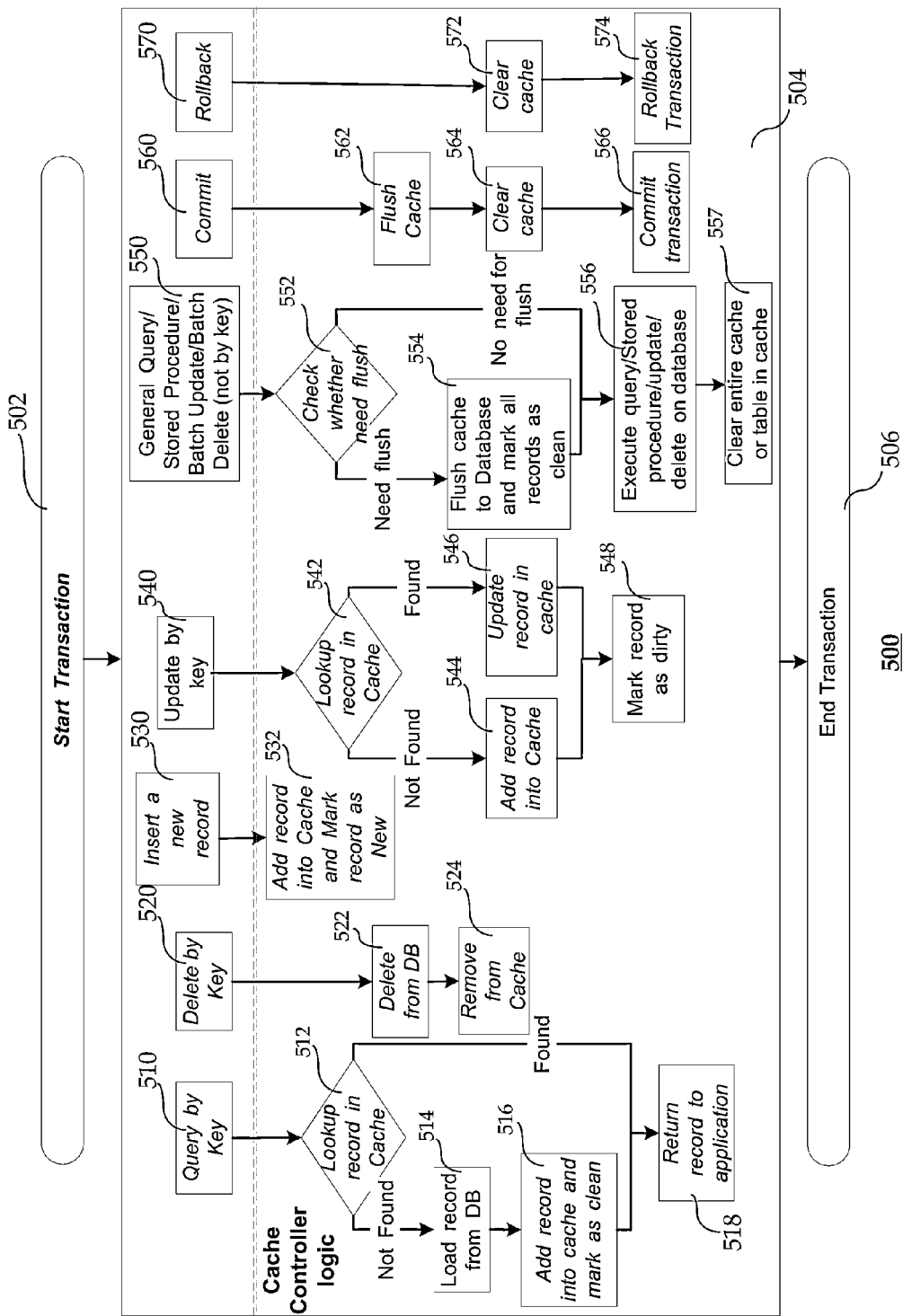
FIG. 5 shows an exemplary method of managing database events.

FIG. 5 shows an exemplary method 500 of managing database events. At 502, the database transaction starts. A database transaction is a sequence of database operations (e.g., SQL) that the DBMS 126 treats as a unit. A transaction brings the database 128 from one consistent state to another, and may be initiated by a user or business application.

At 504, a request to execute one or more database operations is received. The ETC controller 122 handles each operation and takes actions accordingly to the various subroutines shown.

At 510, a Query by Key operation is received. The key used in such query may be a primary key or partial key. At 512, when a Query by Key operation is executed, the ETC controller 122 looks up the record in the ETC 124. If the record is not found in the ETC 124, at 514, it is loaded from the database 128. At 516, the record is added into the ETC 124 and its status is set to Clean. If the record is found in the ETC 124, the cache record is returned to the user or business application (or OLTP unit) at 518.

At 520, a Delete by Key statement is received. As mentioned previously, a Write-through-DB policy may be defined for the Delete operation. At 522, the record corresponding to the key is deleted directly from the database 128. At 524, the corresponding entry in the ETC 124 may also be removed.

At 530, an Insert statement is received. At 532, the new record is added to the ETC 124 and its status is marked as "New."

At 540, an Update by Key statement is received. At 542, the ETC controller 122 looks up the record corresponding to the key in the ETC 124. If the corresponding record is not found, at 544, the ETC controller 122 adds the record into the ETC 124. If the corresponding record is found, at 546, the record in the ETC 124 is updated. At 548, if the previous status is "Clean" or "Dirty," the record in the ETC 124 is marked as "Dirty" to indicate that it needs to be used to update an existing record in the database. If the previous status is "New", the status remains unchanged.

At 550, a General Query, Stored Procedure, Batch Update (not by key) or a Batch Delete (not by key) is received. At 552, the ETC controller 122 checks to see if a Flush is required. To make sure that the flush is effective and the flush order is correct, the ETC controller 122 may implement a policy to determine the necessity of a flush.

For instance, a Flush may be invoked before some general query is executed because some query results may be affected by any newly inserted or old dirty records in the ETC 124. The ETC controller 122 may check to see whether a flush is necessary before the general query is executed. A flush may be necessary if the general query is related to a view. A view generally refers to a query accessible as a virtual table in the database. In addition, a flush may also be necessary if there is any newly inserted or old dirty record in the ETC 124 that is associated with a table that is related to the general query (e.g., SQL table JOIN, sub-query, etc.). It should be noted that these conditions may also be checked before a Stored Procedure, Batch Update (not by key) or a Batch Delete (not by key) is executed.

If a Flush is determined to be necessary, at 554, the ETC controller 122 collects all newly inserted and old dirty records in the ETC 124 according to, for example, table name. The ETC controller 122 then inserts or updates the database 128 with the collected records so as to synchronize the database 128 with the ETC 124. This may be achieved by a bulk operation (e.g., column-wise binding bulk operation). The newly inserted and old dirty records in the ETC 124 are then marked as clean. If a Flush is determined to be unnecessary, the process continues at step 556, where the General Query, Stored Procedure, Batch Update or Batch Delete is executed on the database 128. At 557, in the case of a Stored Procedure, the entire ETC 124 is cleared. In the case of a Batch Update or a Batch Delete, the associated table in ETC 124 is cleared.

At 560, a COMMIT is initiated to complete the transaction and retain the changes in the database 128. Committing the transaction causes the ETC 124 to be flushed at 562. The ETC 124 is then cleared at 564, and the transaction is successfully committed at 566.

At 570, a ROLLBACK is initiated to return the database 128 to the state it was in before the transaction began. Rolling back the transaction causes the ETC 124 to be cleared at 572. The transaction is then successfully rolled-back at 574.

At 506, the transaction ends. The transaction may be terminated by either a COMMIT or a ROLLBACK event.

As discussed previously, the ETC controller 122 may execute a bulk operation to flush the ETC 124. A flush may occur in the following cases: (1) When a transaction is committing; (2) Before some general query is executed; (3) Before some batch update is executed; (4) Before some batch delete is executed; (5) Before all stored procedures are executed; and (6) When developer requests to flush by calling Flush( ) explicitly.

Since a flush delays the execution of Insert and Update operations, the execution order of query statements may also change. The modification of the execution order may cause some issues with order-sensitive query statements and raise a constraint violation (or expression evaluation error).

A constraint may refer to a rule that restricts values in a database. For instance, an SQL database server may allow five types of constraints to be defined: (1) NOT NULL constraint; (2) unique index constraint; (3) primary key constraint; (4) reference integrity (or foreign key) constraint; and (5) check constraint. Other types of constraints may also be defined. A NOT NULL constraint prohibits a database value from being null. A unique index constraint prohibits multiple rows from having the same value in the same column or combination of columns but allows some values to be null. A primary key constraint combines a NOT NULL constraint and a unique constraint in a single declaration. A reference integrity constraint requires values in one table to match values in another table. A check constraint requires a value in the database to comply with a specified condition.

Examples of order-sensitive query statements that may raise constraint violations include Update statements that change either the primary key, unique index or foreign key, Insert and Delete statements. Modifying the execution order of these statements may cause the database server to throw an exception.

For instance, if the execution order of Update and Insert statements is modified, three types of scenarios may occur. In the first scenario, the column of a unique index may be updated as follows:

OITM table: ItemCode is primary key and ItemName is unique column.

Suppose there is already one record in the OITM table: 'I001', 'cpu' . . . .

S1: Update OITM set ItemName='memory' where ItemCode='I001'

S2: Insert into OITM values ('I002', 'cpu', . . . )

If statement S1 is executed before statement S2, the statements will be executed successfully. However, if S1 is executed after S2, S2 will raise an exception due to a unique index constraint violation.

In the second scenario, the column of a foreign key may be updated as follows:

ORDR: OrderID is primary key.

RDR1: (ItemCode, OrderID) is primary key. OrderID is foreign key referring to ORDR.

S1: Update ORDR set OrderID='R002' where OrderID='R001'

S2: Insert into RDR1 values ('R002', 'cpu', . . . )

If statement S1 is executed before statement S2, the statements will be executed successfully. However, if S1 is executed after S2, S2 will raise an exception due to a foreign key constraint violation.

In the third scenario, the column of a foreign key may be updated as follows:

S1: Update RDR1 set OrderID='R002' where OrderID='R001'

S2: Insert into ORDR values ('R002', 'cpu', . . . )

If statement S1 is executed after statement S2, the statements will be executed successfully. However, if S1 is executed before S2, S1 will raise an exception due to a foreign key constraint violation.

In another example, modifying the execution order of different Update operations may also raise constraint violations. For instance, the column of a unique index may be updated as follows:

OITM table: ItemCode is primary key and ItemName is unique column.

Suppose there is already one record in the OITM table: 'I001', 'cpu1' . . . , 'I002', 'cpu2' . . . .

S1: Update OITM set ItemName='cpu2' where ItemCode='I001'

S2: Update OITM set ItemName='cpu3' where ItemCode='I002'

If statement S1 is executed after statement S2, the statements will be executed successfully. However, if S1 is executed before S2, S1 will raise an exception due to a unique index constraint violation.

Similarly, the column of a foreign key may be updated as follows:

S1: Update RDR1 set OrderID='R002' where OrderID='R001'

S2: Update ORDR set OrderID='R002', 'cpu', . . .

If statement S1 is executed after statement S2, the statements will be executed successfully. However, if S1 is executed before S2, S1 will raise an exception due to a foreign key constraint violation. For Update and Delete operations, similar issues may occur if the column of unique index or foreign key is updated.

To address such possible constraint violations, the ETC controller 122 may apply a Write-through-DB policy for order-sensitive Delete statements. The Write-through-DB policy directly removes the record from the database 128. More particularly, the Write-through-DB policy executes database access operations directly on the database 128, instead of first accessing the cache (e.g., marking record as delete) and delaying access operations until a flush is invoked. For order-sensitive Update and Insert statements, the ETC controller 122 may maintain the original execution order of the statements when they first entered the ETC 124. As for other issues caused by incorrect flush order, the user may explicitly call Flush to ensure correct business logic. Such cases are typically very rare in most business applications.

The ETC controller 122 may also perform other functions, such as data version management. One data version management strategy is to use backup buffers for version check control. Backup buffers serve to save a copy of the original contents of the data associated with the database 128. Since the contents of the backup buffers are loaded from database, they may be used to check which fields are modified by comparing the data and backup buffers. Backup buffers may also be used to check whether the record is updated by other clients when a flush happens. If the backup buffers' contents are different from the database records in the data buffers, it means that a newer version has been committed after such records are cached. The current transaction should be a rollback and a concurrent exception should be thrown.

Figure 6:
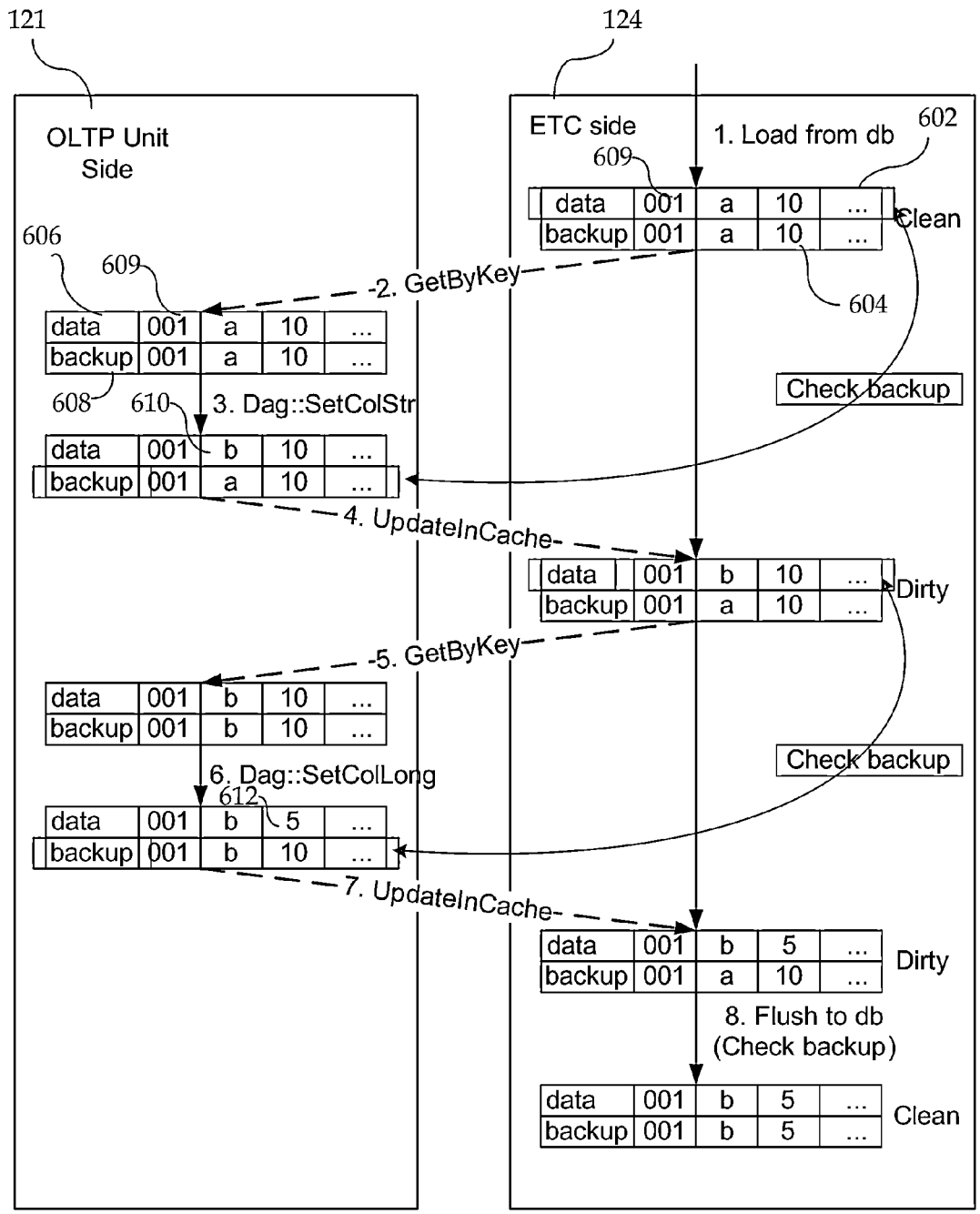
FIG. 6 shows an exemplary method of version check control during an update of normal fields.
Figure 7:
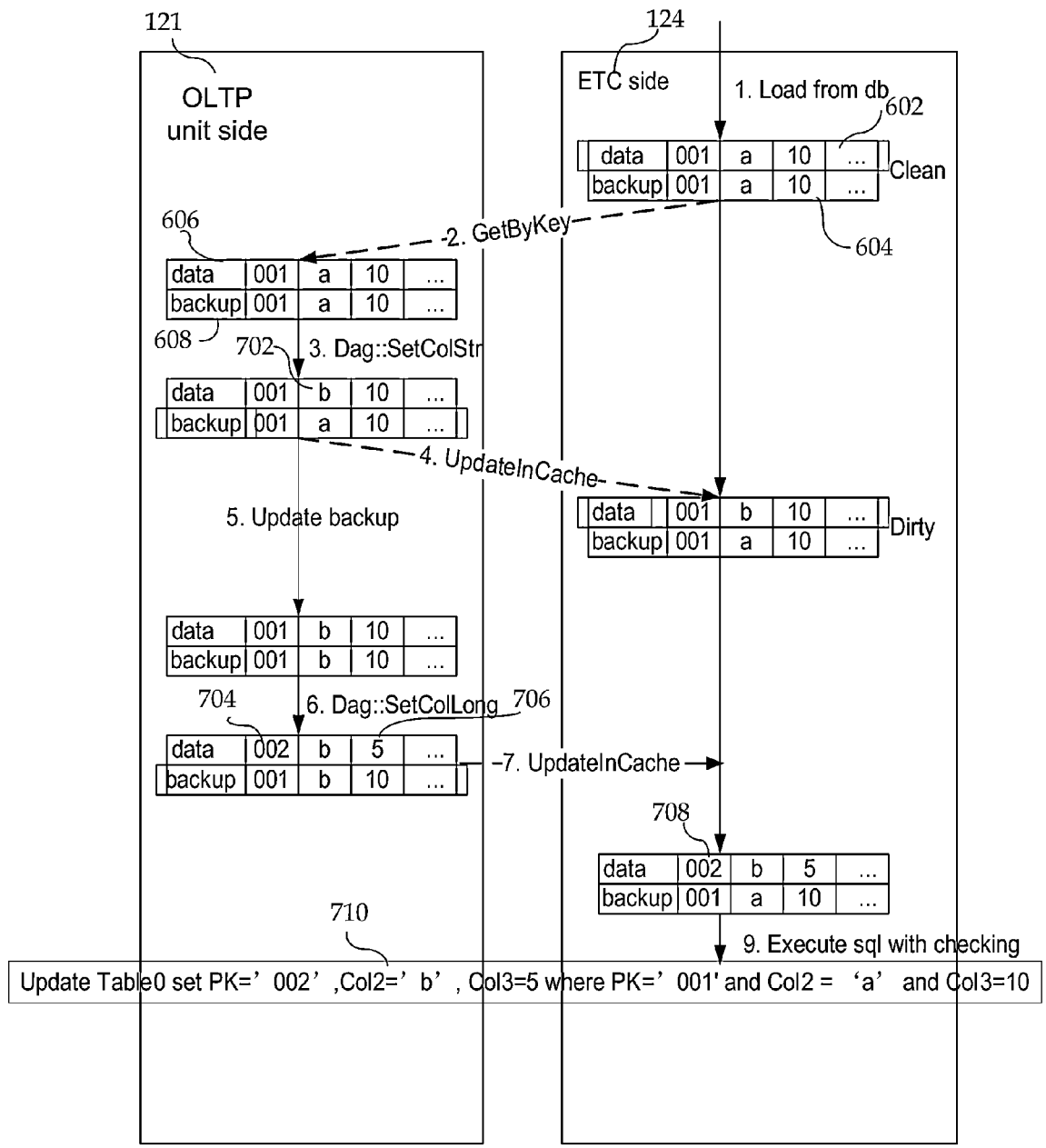
FIG. 7 shows an exemplary method of version check control during an update of primary key fields.

FIGS. 6 and 7 illustrate how the OLTP unit 121 interacts with the ETC 124 to implement version check control using backup and data buffers. As shown, each pair of rows (or records) is a combination of data and backup buffers, and is associated with a record in the database 128. The records in the OLTP unit 121 side are allocated to the application layer and used to perform transaction-related functions, while the records on the ETC 124 side are cached inside the persistence layer. As discussed previously, ETC 124 acts as a proxy for the database 128.

More particularly, FIG. 6 shows an exemplary method of version check control during an update of only normal fields. A normal field generally refers to a column of a relational table that is not a primary key. In this example, the first column of the tables stored in the first and second data buffers (602 and 606) and first and second backup buffers (604 and 608) holds the primary key 609, which identifies a record in the tables.

At Step 1, a record (e.g., row in a table or other data element) may be loaded from the database 128 to the ETC 124. When this happens, the first data buffer 602 may store the database record, while the contents of the first data buffer 602 are copied to the first backup buffer 604. The status of the record is set to Clean.

At Step 2, a GetByKey statement may be called by the user to "Query by Key" or retrieve the record whose key field matches a specified key expression (e.g., 001). Since the status of the record is Clean, the ETC record may be returned to the OLTP unit 121 and stored in the second data buffer 606. The second backup buffer 608 may also store a copy of the record.

At Step 3, a Dag::SetColStr statement may be called by the user to change a string value in a normal field 610 of the table contained in the second data buffer. In such case, the second backup buffer may contain a different or old copy of the record.

At Step 4, a Dag::Update statement may be called by the user to update the ETC 124 or database 128. In response to this statement, the ETC controller 122 may invoke an UpdateInCache statement. If the record is found in the ETC 124, the record in the second data buffer 606 is copied to the first data buffer 602. The status of the record is then set to Dirty. If the Checkbackup flag is true, the second backup buffer 608 is then compared with the first data buffer 602. If the contents of the second backup buffer 608 and the first data buffer 602 are different, an error is reported.

At Step 5, a GetbyKey statement may be called by the user to retrieve the record again. In response, the record in the first data buffer 602 is returned and stored in the second data buffer 606. A copy of the record is copied from the second data buffer 606 to the second backup buffer 608. At Step 6, a DAG::SetColLong statement may be called by the user to change a long integer value in a normal field 612 of the table contained in the second data buffer 606. The contents in the second backup buffer 608 may then be different from the contents in the second data buffer 606.

At Step 7, a Dag::Update statement may be called again by the user to update the ETC 124 or database 128. In response to this statement, the ETC controller 122 may invoke an UpdateInCache statement. If the record is found in the ETC 124, the record in the second data buffer 606 is copied to the first data buffer 602. The status of the record remains as Dirty. If the Checkbackup flag is true, the second backup buffer 608 is then compared with the first data buffer 602. If the contents of the second backup buffer 608 and the first data buffer 602 are different, an error is reported.

At Step 8, a Flush to database statement is invoked. The first backup buffer 604 is first checked to determine if it contains the same dirty record as the first data buffer 602. If it does not, the contents of the first data buffer 602 are copied to the first backup buffer 604. The dirty record in the first data buffer 602 is flushed to the database 128 and the status of the record is set to Clean.

FIG. 7 shows an exemplary method of version check control during an update of primary key fields. It should be noted that such method may also be applied during an update of other fields, such as unique index or foreign key fields. As shown, first data and backup buffers are allocated to the ETC 124, and second data and backup buffers are allocated to the OLTP unit 121 (or business application). The first data buffer 602 temporarily holds data while the data is being moved from the ETC 124 to the database 128 or vice versa. The second data buffer 606 temporarily holds data while the data is being moved from the OLTP unit 121 to the ETC 124 or database 128. In this example, the first column of the tables stored in the first and second data and backup buffers holds the primary key, which identifies each record in the tables.

At Step 1, a record (e.g., row in a table or other data element) may be loaded from the database 128 to the ETC 124. When this happens, the first data buffer 602 may store the record, while the contents of the first backup buffer may be copied from the first data buffer 602 to the first backup buffer 604. The status of the record is set to Clean.

At Step 2, a GetByKey statement may be called by the user to "Query by Key" or retrieve the record whose key field matches a specified key expression (e.g., 001). Since the status of the record is Clean, the record may be returned to the OLTP unit 121 and stored in the second data buffer 606. The second backup buffer 608 may also contain a copy of the record.

At Step 3, a Dag::SetColStr statement may be called by the user to change a string value in a normal field 702 of the table contained in the second data buffer 606. In such case, the second backup buffer 608 may contain a different or an old copy of the record.

At Step 4, a Dag::Update statement may be called by the user to update the ETC 124 or database 128. In response to this statement, the ETC controller 122 may invoke an UpdateInCache statement. If the record is found in the ETC 124, the record in the second data buffer 606 is copied to the first data buffer 602. The status of the record is then set to Dirty. If the Checkbackup flag is true, the second backup buffer 608 is then compared with the first data buffer 602. If the contents of the second backup buffer 608 and the first data buffer 602 are different, an error is reported.

At Step 5, the second backup buffer 608 may also be updated with the contents of the second data buffer 606 in response to the Dag::Update statement.

At Step 6, a DAG::SetColLong statement may be called by the user to change a long integer value in a key field 704 (e.g., from 001 to 002) and a normal field 706 (e.g., from 10 to 5) of the table contained in the second data buffer 606. The contents in the second backup buffer 608 may then be different from the contents in the second data buffer 606.

At Step 7, a Dag::Update statement may be called again by the user to update the ETC 124 or database 128. In response, the ETC controller 122 may invoke an UpdateInCache statement. When the ETC controller 122 finds that the primary key field 708 has been updated, it compares the second backup buffer 608 with the contents of the first data buffer 602 to check if they are the same. If they are the same, it means that the original version of the record in the OLTP unit 121 is the current version, and it is therefore safe to override the cached record in the ETC 124 with the record in the OLTP unit 121. Accordingly, the first data buffer 602 in the ETC 124 will be updated by the second data buffer 606 on the OLTP unit 121 side, and this ETC record may be used to execute update statements when flush is invoked.

At Step 8 (not shown), the ETC controller 122 may execute the update query statement 710 for the new record. To improve performance, the query statement may be executed with a checking condition (e.g., where PK='001' and Col2='a' and Col3=10).

At Step 9, the first data buffer 602 is updated with the new record and its status is set to Clean. The contents of the first data buffer 602 are then copied to the first backup buffer 604.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of transactional caching, comprising:

configuring a transactional cache associated with a column-based in-memory database;

applying a write-through-DB policy for order-sensitive query operations, wherein the write-through-DB policy executes the order-sensitive query operations directly on the database;

delaying execution of a write operation other than the order-sensitive query operations on the database until a flush is determined to be necessary, wherein the write operation is delayed by inserting or updating database records in the transactional cache, wherein the database records store results of a transaction on the database; and invoking the flush by performing a column-wise bulk operation that writes the inserted or updated database records from columns in the transactional cache to respective columns of the database.

2. A computer-implemented method of transactional caching, comprising:

configuring a transactional cache associated with a database;

applying a write-through-DB policy for order-sensitive query operations, wherein the write-through-DB policy executes the order-sensitive query operations directly on the database;

delaying execution of a write operation other than the order-sensitive query operations on the database until a flush is determined to be necessary, wherein the write operation is delayed by inserting or updating database records in the transactional cache, wherein the database records store results of a transaction on the database; and invoking the flush by performing a bulk operation to write the inserted or updated database records in the transactional cache to the database.

3. The computer-implemented method of claim 2 wherein the database comprises an in-memory database.

4. The computer-implemented method of claim 2 wherein the bulk operation comprises a column-wise bulk operation.

5. The computer-implemented method of claim 2 further comprising marking each record in the transactional cache with a status value indicating New, Old, Clean, Dirty, Delete, or a combination thereof.

6. The computer-implemented method of claim 5 wherein the status value is selected from a group consisting of New Clean, New Dirty, New Delete, Old Clean, Old Dirty and Old Delete.

7. The computer-implemented method of claim 5 wherein the status value is selected from a group consisting of New, Old Clean and Old Dirty.

8. The computer-implemented method of claim 2 further comprising:

receiving a query by key operation;

if a corresponding record is not found in the transactional cache, loading the corresponding record from the database into the transactional cache; and if the corresponding record is found in the transactional cache, returning the corresponding record in the transactional cache.

9. The computer-implemented method of claim 2 further comprising:

receiving a delete by key operation; and deleting a corresponding record from the database and the transactional cache.

10. The computer-implemented method of claim 2 further comprising:

receiving an insert operation; and adding a new record to the transactional cache.

11. The computer-implemented method of claim 2 further comprising:

receiving an update by key operation;

if a corresponding record is not found in the transactional cache, adding a new record to the transactional cache; and if the corresponding record is found in the transactional cache, updating the corresponding record in the transactional cache.

12. The computer-implemented method of claim 2 further comprising:

receiving a general query, stored procedure, batch update or batch delete operation; and determining whether the flush is necessary before executing the general query, stored procedure, batch update or batch delete operation on the database.

13. The computer-implemented method of claim 12 wherein the flush is determined to be necessary if the general query, stored procedure, batch update or batch delete operation is related to a view.

14. The computer-implemented method of claim 12 wherein the flush is determined to be necessary if the transactional cache includes any newly inserted or old dirty record that is associated with a table related to the general query, stored procedure, batch update or batch delete operation.

15. The computer-implemented method of claim 2 wherein the flush is invoked when a transaction is committing or before executing a general query, batch update, batch delete or stored procedure.

16. The computer-implemented method of claim 2 wherein the order-sensitive query operations comprise Update operations that change a primary key, unique index or foreign key, Insert or Delete operations.

17. The computer-implemented method of claim 2 further comprising performing version check control of data records associated with the database by comparing data and backup buffers.

18. The computer-implemented method of claim 17 wherein the version check control is performed during update of normal or primary key fields.

19. A non-transitory computer-readable medium having stored thereon program code, the program code executable by a computer to perform a method of transactional caching, comprising:

configuring a transactional cache associated with a database;

applying a write-through-DB policy for order-sensitive query operations, wherein the write-through-DB policy executes the order-sensitive query operations directly on the database;

delaying execution of a write operation other than the order-sensitive query operations on the database until a flush is determined to be necessary, wherein the write operation is delayed by inserting or updating database records in the transactional cache, wherein the database records store results of a transaction on the database; and invoking the flush by performing a bulk operation to write the inserted or updated database records in the transactional cache to the database.

20. A system for transactional caching, comprising:

a non-transitory memory device for storing computer-readable program code; and a processor in communication with the memory device, the processor being operative with the computer-readable program code to:

configure a transactional cache associated with a database, apply a write-through-DB policy for order-sensitive query operations, wherein the write-through-DB policy executes the order-sensitive query operations directly on the database, delay execution of a write operation other than the order-sensitive query operations on the database until a flush is determined to be necessary, wherein the write operation is delayed by inserting or updating database records in the transactional cache, wherein the database records store results of a transaction on the database, and invoke the flush by performing a bulk operation to write the inserted or updated database records in the transactional cache to the database.

* * * * *